United States Patent
Labbee et al.

(10) Patent No.: US 11,700,228 B2
(45) Date of Patent: *Jul. 11, 2023

(54) HARDWARE ADDRESS CONSISTENCY MANAGEMENT

(71) Applicant: Charter Communications Operating, LLC, St. Louis, MO (US)

(72) Inventors: Micah Labbee, Aurora, CO (US); Tyson Vinson, Denver, CO (US); Chris Turner, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,035

(22) Filed: Apr. 8, 2022

(65) Prior Publication Data

US 2022/0231989 A1 Jul. 21, 2022

Related U.S. Application Data

(63) Continuation of application No. 17/089,687, filed on Nov. 4, 2020, now Pat. No. 11,316,826.

(51) Int. Cl.
  *H04L 12/28* (2006.01)
  *H04L 61/2592* (2022.01)
  *H04L 12/46* (2006.01)
(52) U.S. Cl.
  CPC ...... *H04L 61/2592* (2013.01); *H04L 12/4633* (2013.01)

(58) Field of Classification Search
  CPC .................... H04L 61/2592; H04L 12/4633
  See application file for complete search history.

(56) References Cited

U.S. PATENT DOCUMENTS 7,792,963 B2    9/2010 Gould
10,826,723 B1 * 11/2020 Strauss ............... H04L 12/4633
(Continued)

FOREIGN PATENT DOCUMENTS

WO    2020039373 A1    2/2020
WO    WO-2020039373 A1 *  2/2020 ............ H04W 40/20

OTHER PUBLICATIONS

About. OpenSync. (n.d.). Retrieved Aug. 18, 2020, from https://www.opensync.io/about. 10 pages.
(Continued)

*Primary Examiner* — Phyllis A Book
(74) *Attorney, Agent, or Firm* — Otterstedt & Kammer PLLC

(57) ABSTRACT

A VPN tunnel interface is instantiated within a router based on a tunnel network namespace. One or more virtual peers corresponding to the VPN tunnel interface and one or more virtual ethernet interfaces corresponding to the one or more virtual peers are instantiated. The tunnel network namespace is configured to route, based on a source address, network traffic from a specified client device to a specified virtual peer of the one or more virtual peers via the VPN tunnel interface. A connection is established between a client device and a VPN process of the router and a traffic flow is transported to and from the client device through a VPN tunnel via the VPN tunnel interface, the one or more virtual peers, and the one or more virtual ethernet interfaces.

22 Claims, 12 Drawing Sheets

(56) References Cited

U.S. PATENT DOCUMENTS

| | | | |
|---|---|---|---|
| 11,044,118 B1* | 6/2021 | Reed | H04L 12/4645 |
| 11,316,826 B1 | 4/2022 | Labbee | |
| 2003/0056217 A1 | 3/2003 | Brooks | |
| 2006/0130107 A1 | 6/2006 | Gonder et al. | |
| 2007/0217436 A1 | 9/2007 | Markley | |
| 2009/0248794 A1 | 10/2009 | Helms | |
| 2010/0313236 A1 | 12/2010 | Straub | |
| 2013/0250947 A1* | 9/2013 | Zheng | H04L 45/02 |
| | | | 370/389 |
| 2017/0005923 A1* | 1/2017 | Babakian | G06F 9/45558 |
| 2018/0062920 A1* | 3/2018 | Srinivasan | H04L 67/1097 |
| 2018/0063087 A1* | 3/2018 | Hira | H04L 61/2514 |
| 2018/0063176 A1* | 3/2018 | Katrekar | H04L 63/062 |
| 2019/0182155 A1* | 6/2019 | Chang | H04L 61/251 |
| 2020/0169503 A1* | 5/2020 | Tubaltsev | H04L 45/74 |

OTHER PUBLICATIONS

Wikimedia Foundation. (Jul. 13, 2021). Tun/Tap. Wikipedia. Retrieved Sep. 21, 2020, from https://en.wikipedia.org/wiki/TUN/TAP. 2 pages.

* cited by examiner

HARDWARE ADDRESS CONSISTENCY MANAGEMENT

CROSS-REFERENCE TO RELATED APPLICATION

This application is a continuation of co-assigned U.S. patent application Ser. No. 17/089,687 of inventors Micah Labbee et al., and claims the benefit thereof, said application Ser. No. 17/089,687 having been filed on Nov. 4, 2020, and entitled "HARDWARE ADDRESS CONSISTENCY MANAGEMENT." The complete disclosure of the aforesaid application Ser. No. 17/089,687 is expressly incorporated herein by reference in its entirety for all purposes.

FIELD OF THE INVENTION

The present invention relates generally to the electrical, electronic and computer arts, and, more particularly, to a mechanism for providing physical/hardware address consistency management in a communication network.

BACKGROUND OF THE INVENTION

Network-based devices, such as such as mobile phones, tablet computers, and the like, are conventionally associated with customer premises equipment, such as cable-based routers, and maintain communications with the customer premises equipment and users of the customer premises equipment via consistent network addresses. Often, the network-based devices may be mobile and may roam via wireless communications with the Internet and other networks. The address, such as a hardware address, an Ethernet address, and the like, of the roaming device is not conventionally conveyed to the customer premises equipment and is accordingly unknown to users associated with the customer premises equipment. Thus, a user, such as a parent looking to configure the parental controls of the mobile device, may be unable to locate and/or access the mobile device to implement the parental controls.

SUMMARY OF THE INVENTION

Principles of the invention provide a mechanism for hardware address consistency management. In one aspect, an exemplary method includes operations of instantiating a VPN tunnel interface within a router based on a tunnel network namespace; instantiating one or more virtual peers corresponding to the VPN tunnel interface; instantiating one or more virtual ethernet interfaces corresponding to the one or more virtual peers; configuring the tunnel network namespace to route the network traffic from a specified client device to a specified virtual peer of the one or more virtual peers via the VPN tunnel interface, the routing being based on a source address; establishing a connection between a client device and a VPN process of the router; and transporting a traffic flow to and from the client device through a VPN tunnel via the VPN tunnel interface, the one or more virtual peers, and the one or more virtual ethernet interfaces, based on the configured tunnel network namespace.

In one aspect, a system for communicating with a plurality of client devices comprises a router having a default network namespace, a virtual private network (VPN) process, a virtual private network (VPN) tunnel interface, one or more virtual peers, and one or more virtual ethernet interfaces; a VPN tunnel; and a router controller having a memory and at least one processor coupled to the memory, the router controller configured to trigger an instantiation of the VPN tunnel interface within the router based on a tunnel network namespace; trigger an instantiation of the one or more virtual peers, within the tunnel network namespace, corresponding to the VPN tunnel interface; trigger an instantiation of the one or more virtual ethernet interfaces, corresponding to the one or more virtual peers, within the default network namespace; and configure the tunnel network namespace to route network traffic from a specified one of the client devices to a specified virtual peer of the one or more virtual peers via the VPN tunnel interface, the routing being based on a source address; wherein the router and the router controller are cooperatively configured to establish a connection between the specified client device and the virtual private network (VPN) process and transport a traffic flow to and from the specified client device through the VPN tunnel via the VPN tunnel interface, the one or more virtual peers, and the one or more virtual ethernet interfaces, based on the configured tunnel network namespace.

In another aspect, a router controller is provided for controlling a router. The router has a default network namespace and a virtual private network (VPN) process, and is in communication with a plurality of client devices. The router controller includes a memory; and at least one processor, coupled to the memory, and operative to: trigger an instantiation of a VPN tunnel interface within the router based on a tunnel network namespace; trigger an instantiation of one or more virtual peers, within the tunnel network namespace, corresponding to the VPN tunnel interface; trigger an instantiation of one or more virtual ethernet interfaces, corresponding to the one or more virtual peers, within the default network namespace; and configure the tunnel network namespace to route network traffic from a specified one of the client devices to a specified virtual peer of the one or more virtual peers via the VPN tunnel interface, the routing being based on a source address. The router controller further configures the router such that the router and the router controller are cooperatively configured to establish a connection between the specified client device and the virtual private network (VPN) process and to transport a traffic flow to and from the specified client device through a VPN tunnel via the VPN tunnel interface, the one or more virtual peers, and the one or more virtual ethernet interfaces, based on the configured tunnel network namespace.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a router, a computer configured as a virtual router, a router controller, networked combinations of the same, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:
 implementation of consistent physical/hardware address management for mobile devices associated with customer premises equipment; and
 implementation of novel techniques using orchestration, L3 VPN (Level 3 Virtual Private Network), and Linux networking features that can be easily integrated with existing system hardware, thereby providing consistent network addresses without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
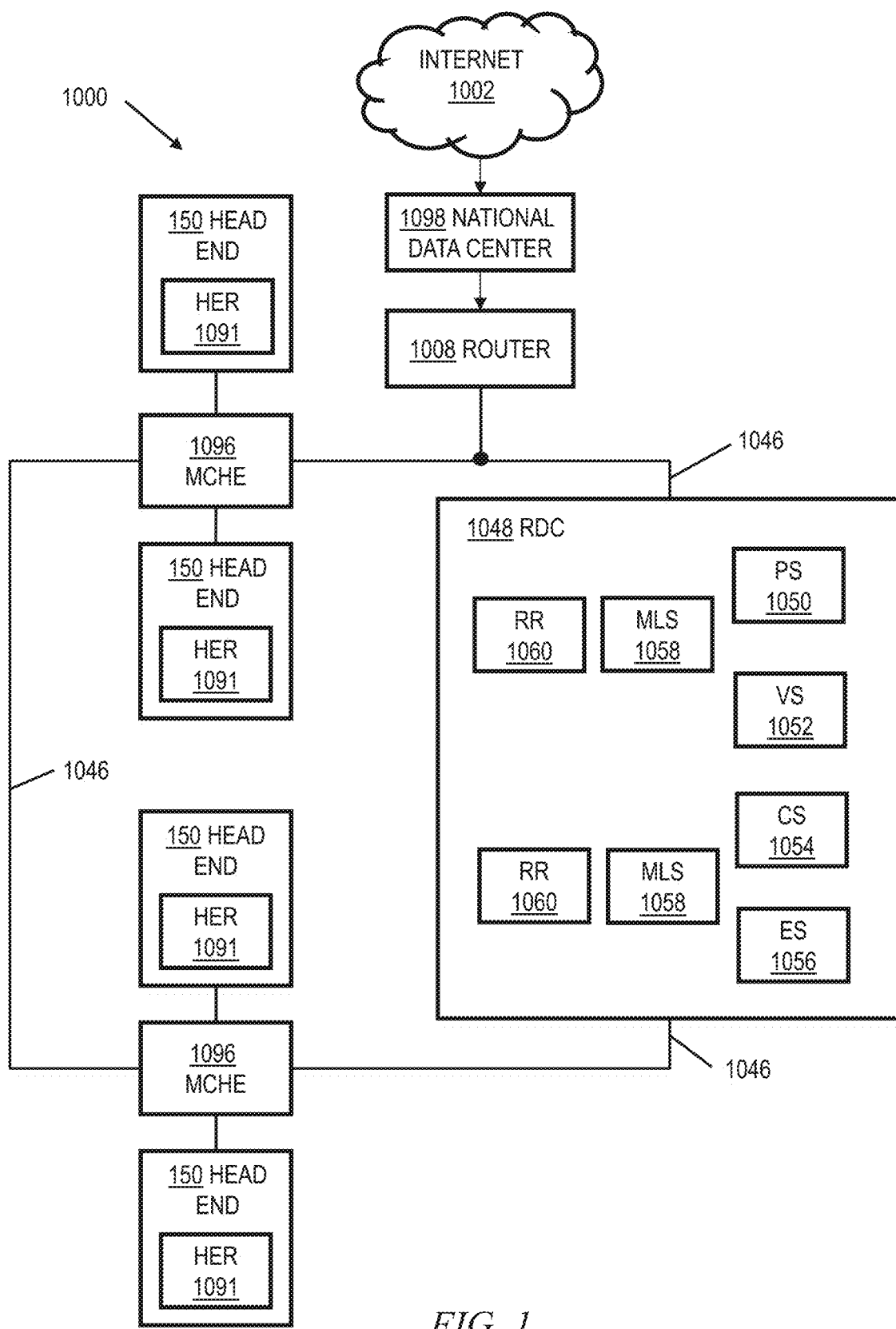
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
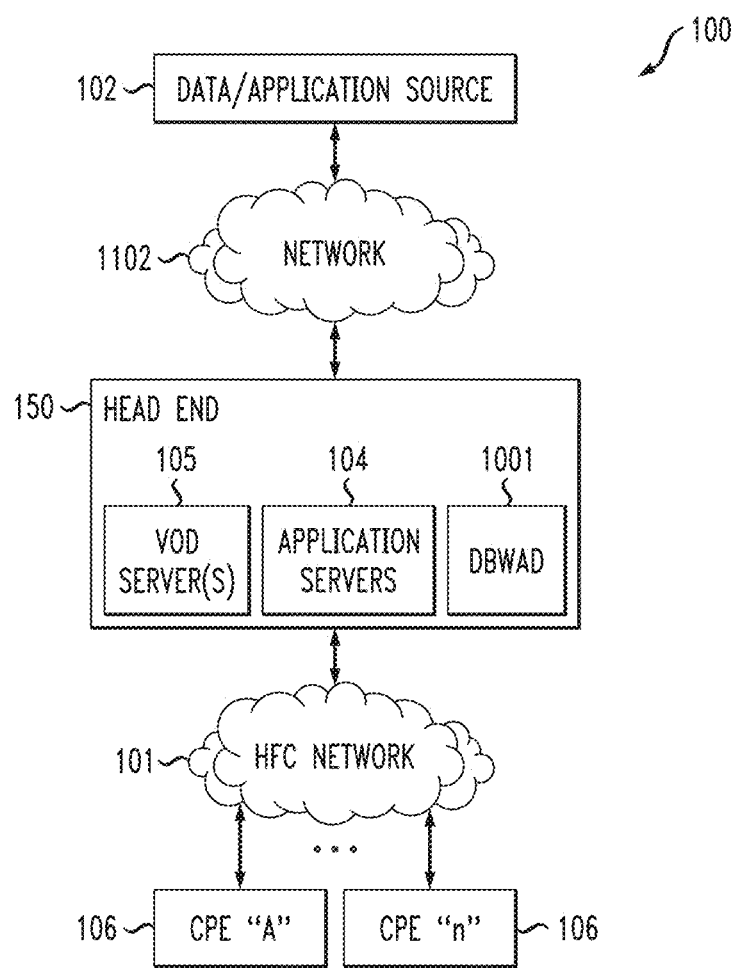
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components.

Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
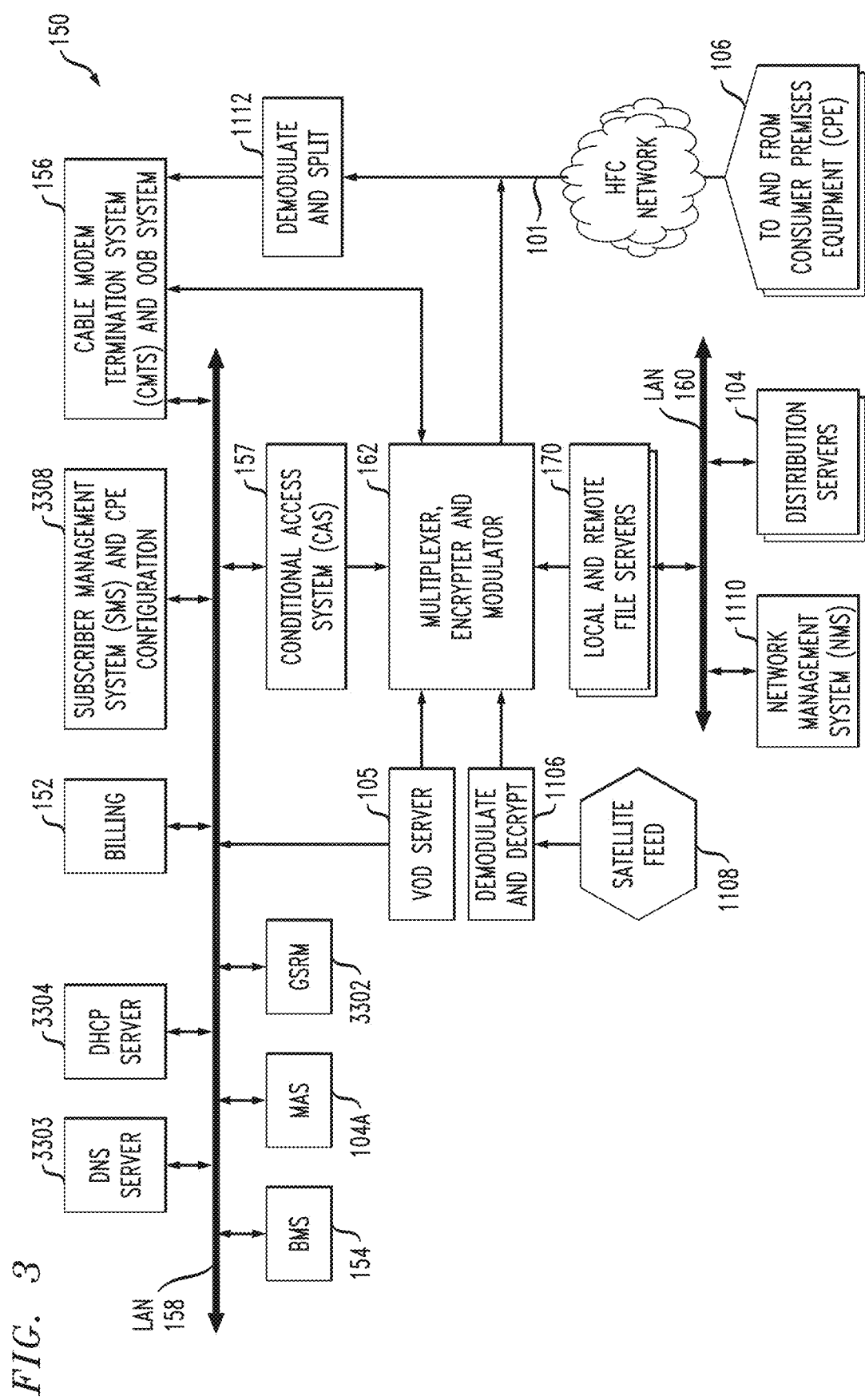
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
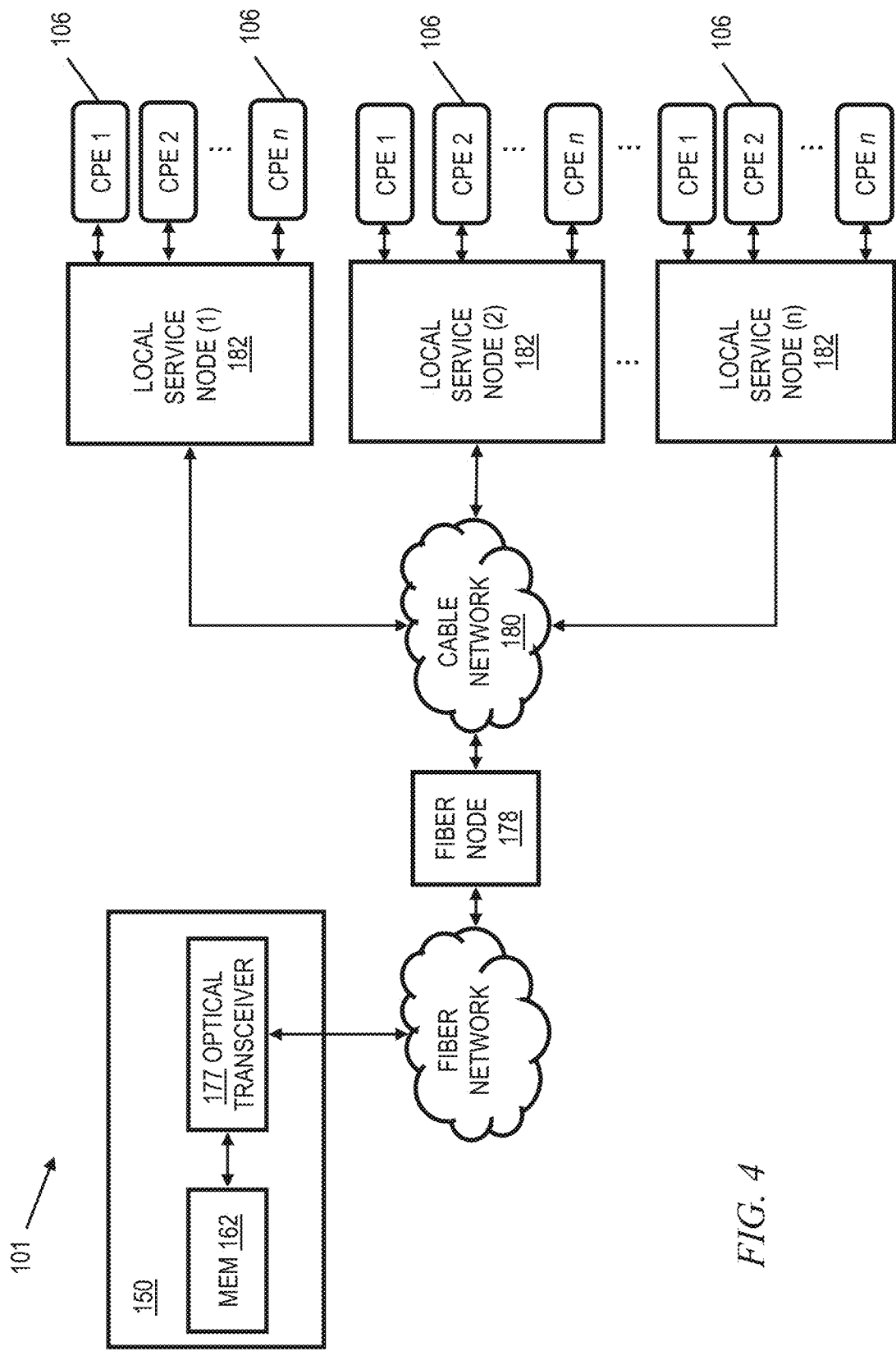
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
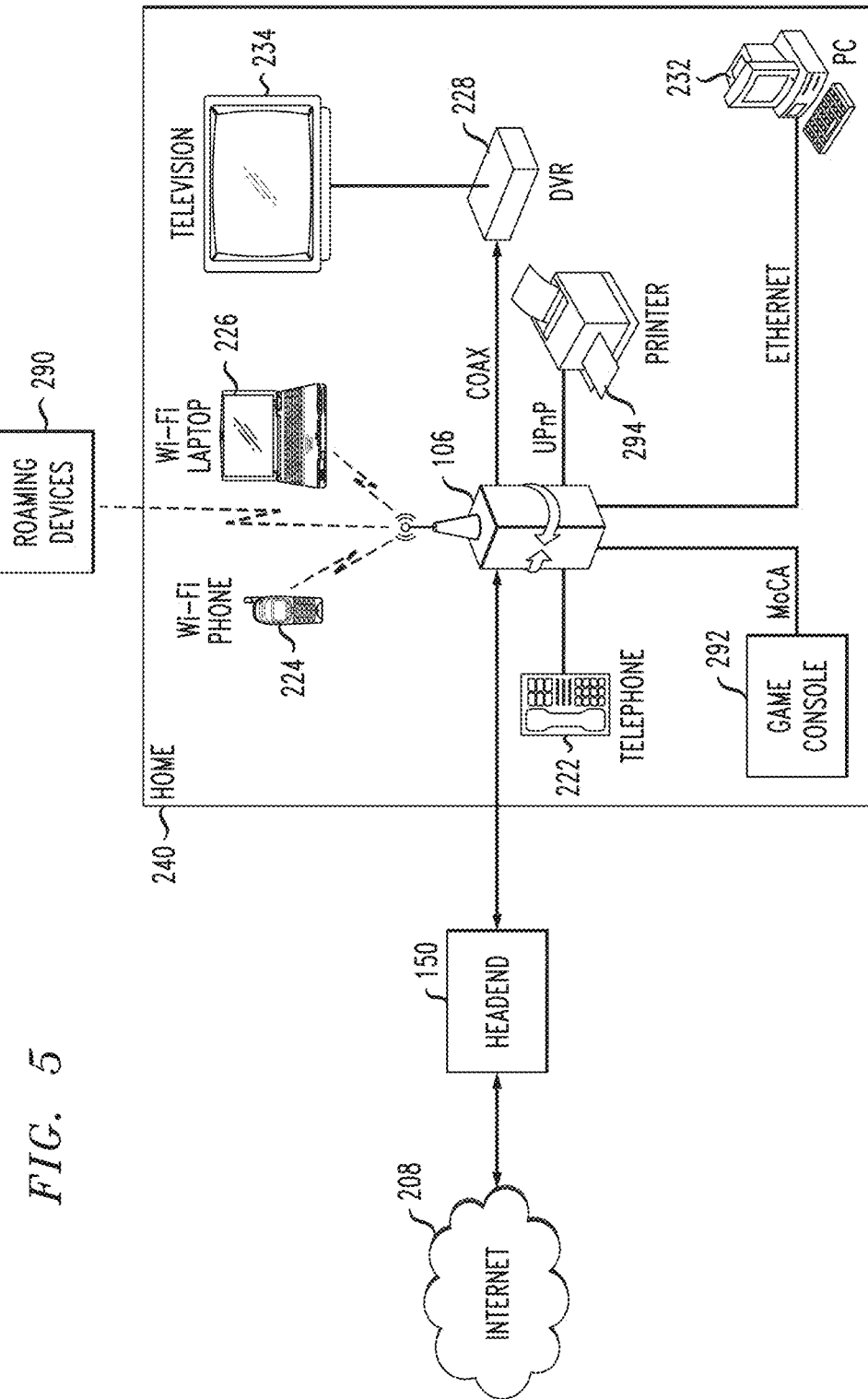
FIG. 5 is a functional block diagram of a premises network, including an exemplary centralized customer premises equipment (CPE) unit, interfacing with a head end such as that of FIG. 3.
Figure 6:
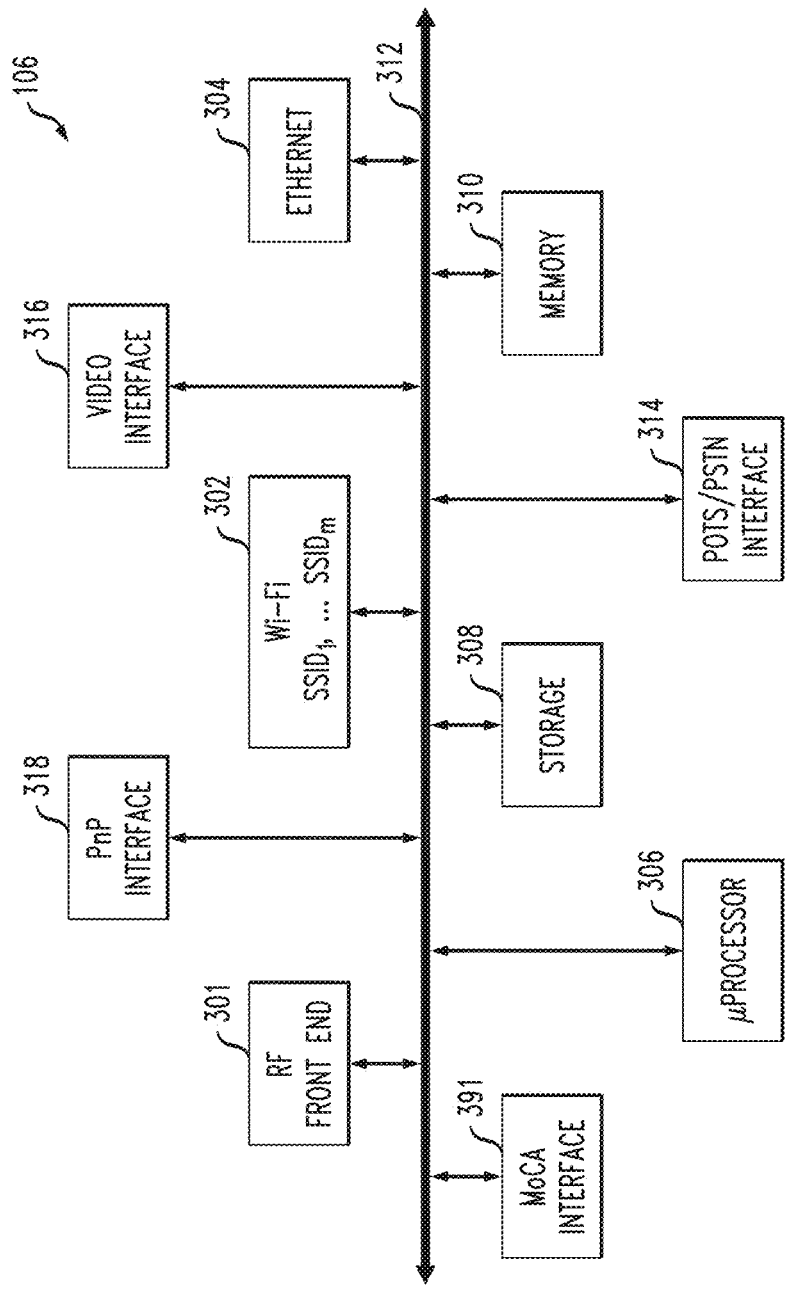
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a media access control (MAC) address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
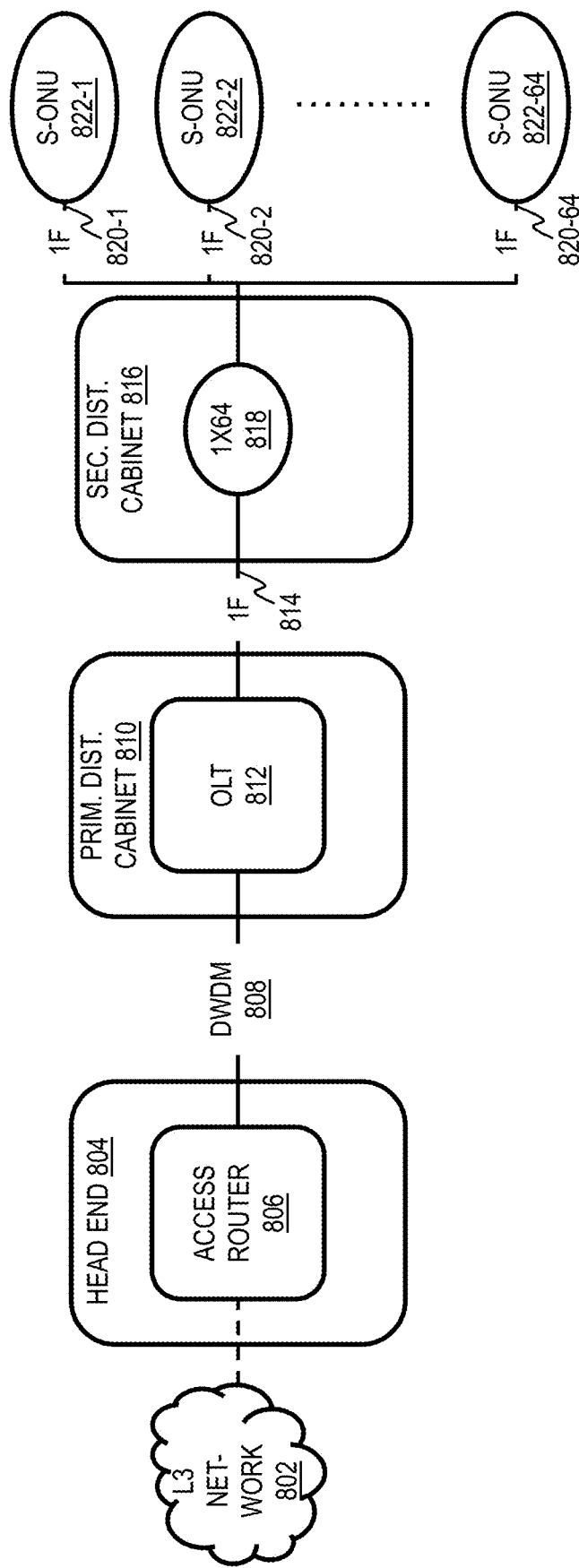
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
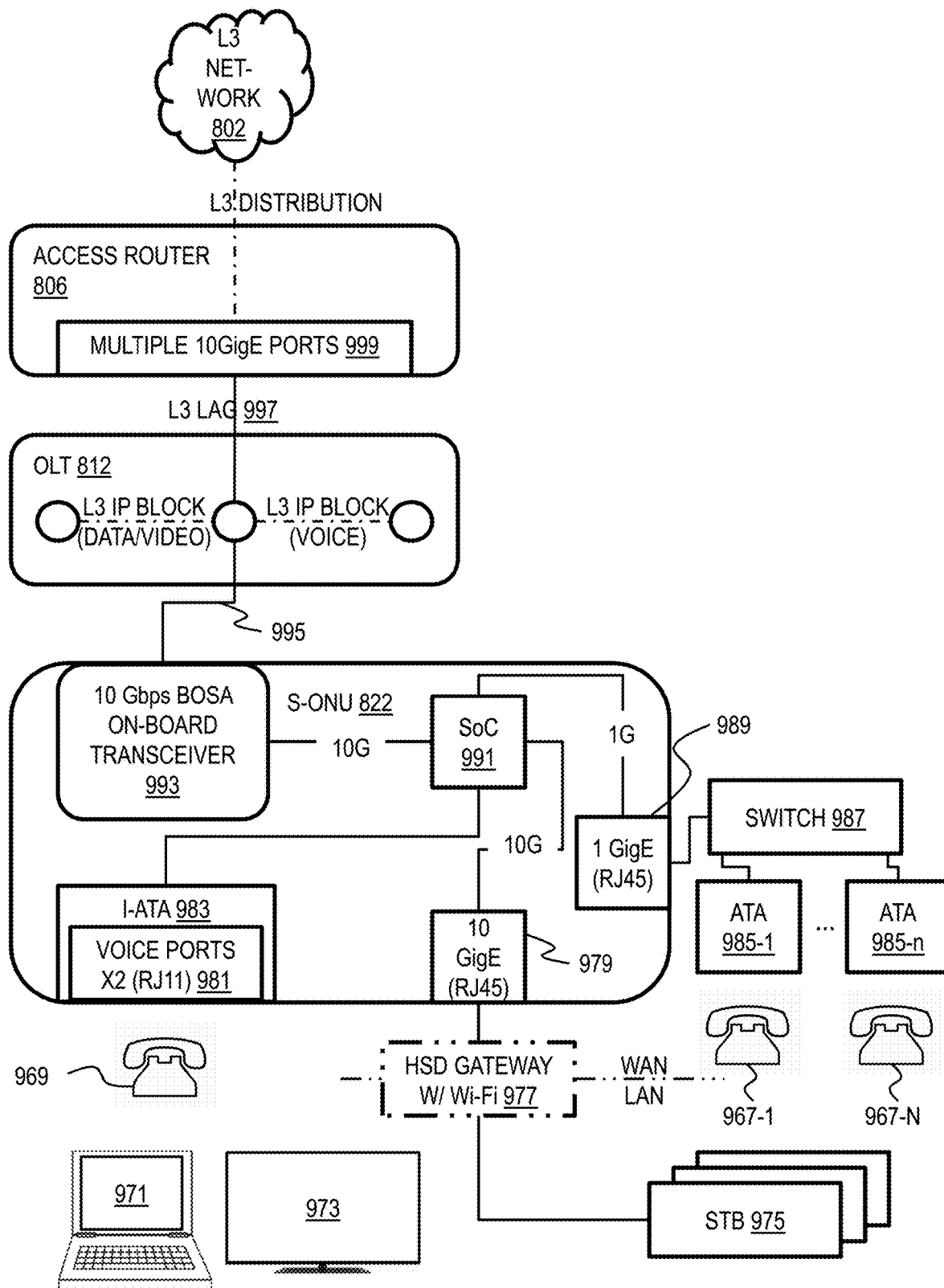
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and methods for providing physical/hardware address consistency management. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

One or more embodiments provide systems and methods for providing consistent physical address management across an L3 network. In one example embodiment, a device, such as a mobile phone, tablet computer (e.g. a Long-Term Evolution (LTE)-connected) device, and the like, that is associated with the CPE 106 operates remotely from the CPE 106 via, for example, the Internet. The CPE 106 may have various associated rules and software configured on the assumption that operation will be in a LAN (local area network—see FIG. 5) environment based on Layer2/Ethernet addresses.

Communications with and/or access to the device are often required to perform various tasks. For example, a user may look to configure parental controls on the device by utilizing a known Ethernet address to access the device (note that an ethernet address is exemplary; the skilled artisan will of course appreciate that wireless standards are separate from ethernet standards). It is often preferable, therefore, to maintain a consistent physical address for the device, such as a Layer 2 address, an Ethernet address, and the like, so that the rules on the CPE 106 are applied consistently on the device, regardless of whether the device is on the LAN in the premises, or operating remotely from the LAN.

In one example embodiment, a Layer 2 VPN (virtual private network) tunnel is implemented to maintain the same Ethernet address through the tunnel. This may be accomplished by transporting the Ethernet header with the network traffic flow through the tunnel. (It is noted that the establishment of a Layer 2 VPN tunnel is not available on some network-based devices.)

In one example embodiment, a Layer 3 VPN tunnel is implemented to maintain the same Ethernet address through the tunnel. The Layer 3 VPN tunnel terminates inside a separate network namespace (a logical container for a networking stack) of, for example, a router. The network namespace is used to "plumb" the device through the system with its original Ethernet address, thereby maintaining physical address consistency.

Figure 10:
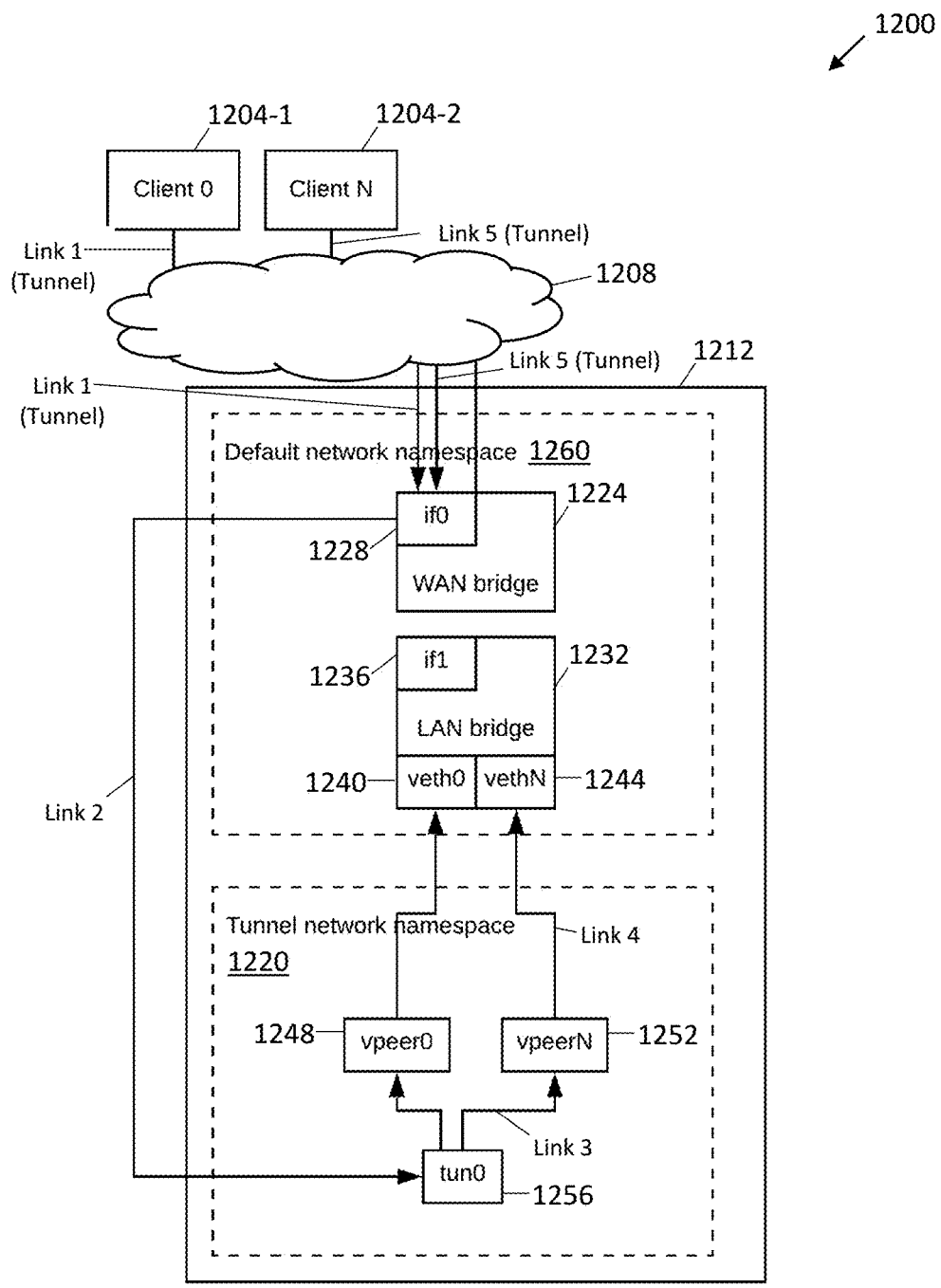
FIG. 10 is a high-level block diagram of an example network configuration, in accordance with an example embodiment.

FIG. 10 is a high-level block diagram of an example network configuration 1200, in accordance with an example embodiment. In one example embodiment, client devices 1204-1, 1204-2 are configured to communicate with a VPN process (such as an Open VPN process) of a router 1212, such as a router residing in a residence corresponding to the CPE 106 (when the client device 1204-1, 1204-2 is operating locally), a virtual router residing in the cloud near the location of the client devices 1204-1, 1204-2 (when the client device 1204-1, 1204-2 is operating remotely), and the like. Optionally, customers, technicians, and the like do not have any direct configuration interaction with the router 1212.

In the configuration of FIG. 10, the client devices 1204-1, 1204-2 are operating remotely via a network 1208, such as the Internet. A virtual router 1212 that resides in the cloud manages communications between the entry of the network traffic to the network 1208 and a LAN residing in a residence corresponding to the CPE 106. In one example embodiment, the virtual router 1212 is instantiated in the regional data center 1248 or the national data center 1298. In one example embodiment, the virtual router 1212 is instantiated by an API call from the regional data center 1248, the national data center 1298, and the like to an internal or external compute farm which instantiates the virtual router 1212 configured specifically to service a corresponding client device 1204-1, 1204-2.

The network traffic flow is transported through a VPN tunnel (labeled Link 1 for the client device 1204-1 and Link 5 for the client device 1204-2) via an interface 1228 of a WAN bridge 1224 within the virtual router 1212. In one example embodiment, the interface 1228 is a physical or virtual ethernet adapter, and the WAN bridge 1224 is a virtual network switch, such as a Linux bridge and the like. Together, the interface 1228 and the WAN bridge 1224 are used to connect to the tunnel interface terminating on the respective client device 1204-1, 1204-2. The interface 1228 (also referred to as VPN tunnel interface 1228 herein) essentially implements a VPN tunnel. The VPN tunnel interface 1228 listens for client connections in the default network namespace 1260 and sends the corresponding client traffic via Link 2 to the tun0 1256 (also referred to as TUN device 1256 and VPN tunnel interface 1256 herein) in the tunnel network namespace 1220.

In FIG. 10, Link 2 represents the traffic flow to an application that is connected, for example, by Linux. In one example embodiment, Link 2 is implemented by the TUN (TUN/TAP tunnel) device 1256 that emulates a network interface. A program in the user space attached to the device receives the packets transported via the TUN device 1256. Elements 1224 and 1228 are used together in one or more embodiments to connect to the tunnel interface for the VPN.

A tunnel interface of the TUN device 1256 is instantiated based on a tunnel network namespace 1220 to, for example, perform policy enforcement for the network traffic being routed from the client device 1204-1, 1204-2, through the WAN bridge 1224, and ensures that network traffic arrives at the WAN bridge 1224 with the correct hardware address. The network namespace 1220 is responsible for isolating the network traffic from the client device 1204-1, 1204-2; without the network namespace 1220, the router 1212 would send internet-destined traffic out the WAN bridge 1224, bypassing the bulk of the policy implemented by the router 1212.

In one or more embodiments, packets sent by an operating system via the TUN device 1256 are delivered to a user-space program which attaches itself to the TUN device 1256. A user-space program may also pass packets into a TUN device 1256. In this case, the TUN device 1256 delivers (or "injects") these packets to the operating-system network stack, thus emulating their reception from an external source. In one or more embodiments, policy enforcement such as parental controls, device pause, and the like occurs on WAN bridge 1224. The TUN device 1256 is part of the mechanism to make sure the traffic arrives at element 1224 with the correct hardware address.

A virtual peer 1248, 1252 is instantiated for each client device 1204-1, 1204-2 (generally numbered from zero to N; any suitable number of devices can be provided). The virtual ethernet interfaces 1240, 1244 and virtual peers 1248, 1252 are responsible for wrapping network traffic from a remotely connected device with layer 2 ethernet headers that contain the MAC address which has the configured policy, and responsible for getting the network traffic into the default network namespace 1260 at the correct attachment point. Each virtual peer 1248, 1252 encapsulates the traffic flow using the original MAC address of the client device 1204-1, 1204-2. Links 3 and 4 represent the traffic flow through the corresponding virtual peer 1248, 1252 to a corresponding virtual ethernet interface 1240, 1244 which emulate a conventional ethernet connection. The traffic flow then continues through the customer premises LAN via the interface 1236 of the LAN bridge 1232 to an entity on the LAN.

Figure 11:
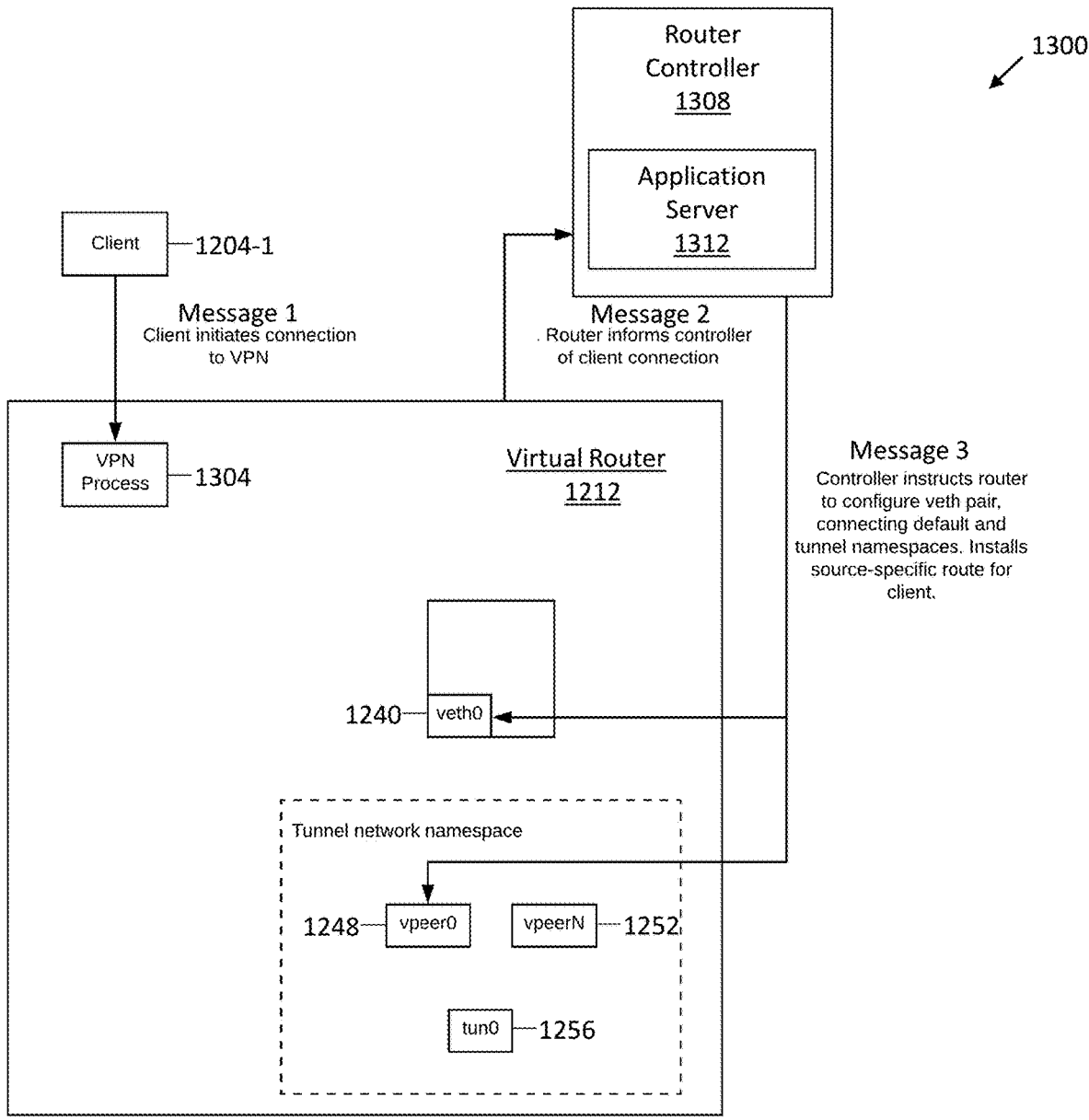
FIG. 11 illustrates an example message flow for the network configuration of FIG. 10, in accordance with an example embodiment.

FIG. 11 illustrates an example message flow 1300 for configuring the network 1208 of FIG. 10, in accordance with an example embodiment. In one example embodiment, Message 1 initiates a connection between a client device (in the example, 1204-1 but could also be 1204-2) and a VPN process 1304. A router controller 1308 is notified of the client connection via Message 2. The router controller 1308 then triggers a configuration of the corresponding virtual peer 1248, 1252 and the corresponding virtual ethernet interface (in the example, 1240 but could also be 1244) via Message 3, as described more fully below in conjunction with FIG. 12. In one example embodiment, the messages contain VPN handshake data such as authentication information, supported cryptography ciphers, and client identifiers.

In the embodiment of FIG. 10, one virtual ethernet pair per client is created to bridge the tunnel network namespace 1220 (also referred to as hardware address consistency management namespace 1220 herein) to the default network namespace 1260. Source-based routes are installed to direct client traffic to the correct virtual ethernet pair, such that when client traffic arrives in the default network namespace its hardware address is consistent as though it were appearing natively on the local network segment. The virtual router 1212 can be instantiated, for example, in an MSO network, or might be instantiated on a public cloud through the use of published APIs. The virtual router 1212 could be instantiated, for example, by an API call from the MSO cloud to either an internal or external compute farm which starts up a virtual router 1212 configured specifically to service this client.

In a general scenario, client 1204-1 is on a network that is external to the MSO providing service in the premises; for example, a Wi-Fi network in a coffee shop, an LTE mobile telephony network, or the like. A router in the customer's home has a set of policies/rules, and a virtual router 1212 is built in the cloud with all of the polices/rules synchronized thereto. For example, a user lives in Los Angeles and his or her physical router is in his or her home in Los Angeles. The user flies to New York and a virtual router 1212 is set up in the cloud near New York (generally, in a head end, regional data center 1248, or national data center 1298, as discussed above), which mirrors the policies/rules on the home router. In an alternative embodiment, the home router runs the VPN and the virtual router 1212 is not used. Controller 1308 can reside in the cloud (e.g. as a web service), in a national data center 1298, or the like.

Figure 12:
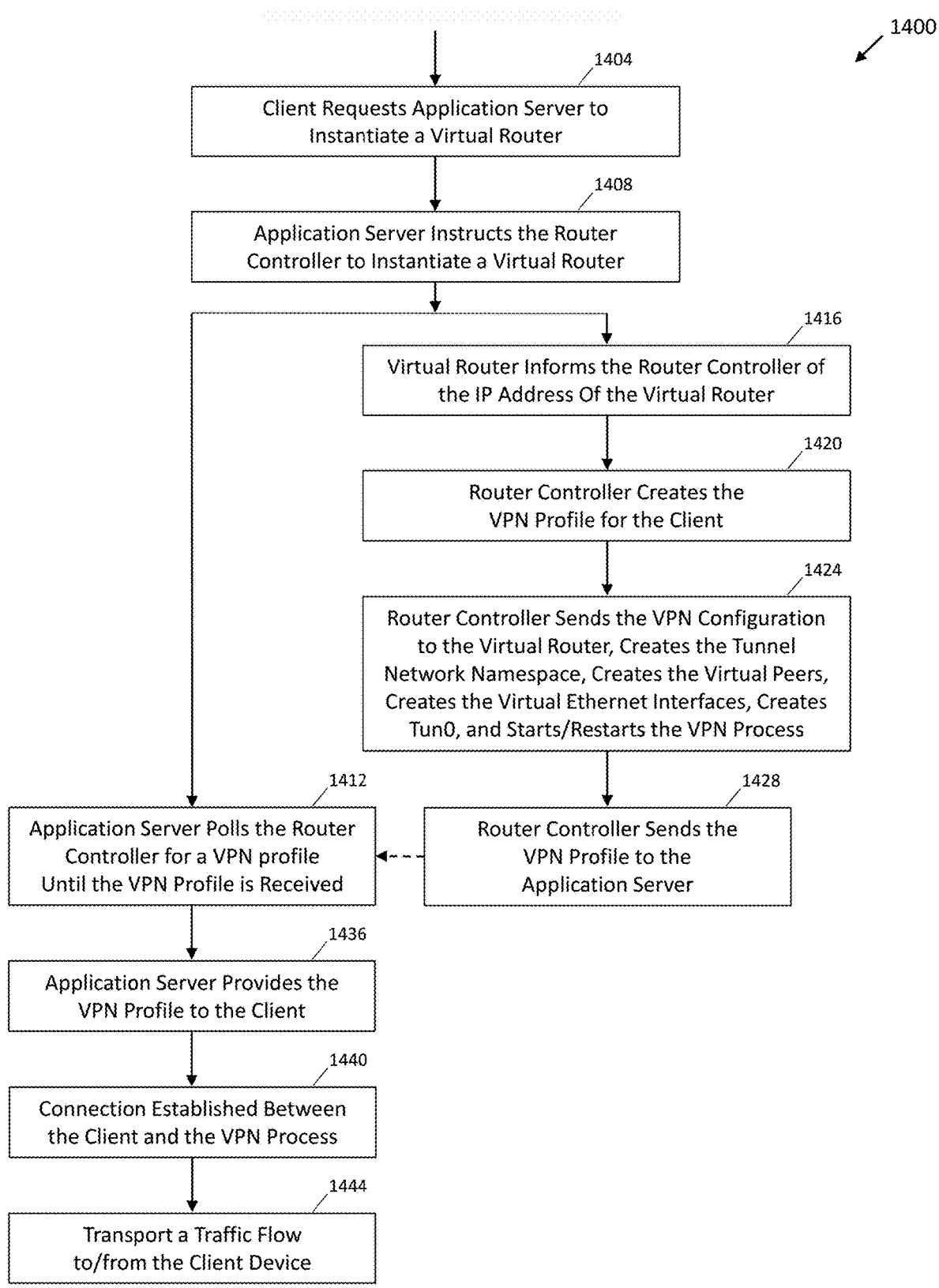
FIG. 12 is a flowchart of an example method for configuring the network of FIG. 10, in accordance with an example embodiment.

FIG. 12 is a flowchart of an example method 1400 for configuring the network 1208 of FIG. 10, in accordance with an example embodiment. In one example embodiment, a VPN profile is provisioned for a client 1204-1 based on the operations of method 1400. Using OpenVPN as an example, the VPN profile, in one example embodiment, is configured as follows (templated configuration bounded by asterisks):

```
Client:
    client
    dev tun
    remote *endpoint*
    proto tcp
    ca *key materials*
    cert *key materials*
    key *key materials*
Server (cloud router):
    server 172.16.0.0 255.255.255.0
    dev tun
    proto tcp
    ca *key materials*
    cert *key materials*
    key *key materials*
    dh *key materials*
```

Prior to the issuance of Message 1 of the message flow 1300, the VPN profile is provisioned for the client 1204-1. For example, consider a communication from the client 1204-1 to the router controller 1308, which is mediated by an application server 1312 (provided by the router controller 1308 or another network-based component). In one example embodiment, the client 1204-1 connects to the application server 1312 to request the instantiation of a virtual router 1212, the request including a MAC address of the client 1204-1 (operation 1404). The application server instructs the router controller 1308 to instantiate the virtual router 1212 (operation 1408), and starts polling the router controller 1308 for the VPN profile for the client 1204-1 (operation 1412). (The operations 1404 and 1408 may be implemented using, for example, the pseudocode: create_router(client_hardware="001122334455")). The virtual router 1212 informs the router controller 1308 of the IP address of the virtual router 1212 (operation 1416). (The operation 1416 may be implemented using, for example, the pseudocode: hello(ip=123.123.123.123)). In general, the virtual router 1212 needs to inform the router controller 1308 of its IP address since the client 1204-1 needs to know the address to connect to; that IP address is an element of the VPN Profile. If there were a network outage that interrupted communication between the data plane network of the virtual router 1212 and the cloud service that the virtual router 1212 was instantiated in, then the virtual router 1212 would never "check in." In a situation such as this, the control plane communication of the cloud service would presumably be available (otherwise, the attempt to instantiate would not have reached the cloud service), so the router controller 1308 would submit a request to destroy the virtual router 1212 and try to instantiate it again on another cloud service/region/availability zone. The second attempt would be executed, for example, after some period of time after the virtual router 1212 fails to check in (and the same if the control plane communication to a particular cloud service is not available). The router controller 1308 creates the VPN profile for the client 1204-1, including a client MAC address (for ID or certificate) and a virtual router IP address for the endpoint (operation 1420). (The operation 1420 may be implemented using, for example, the pseudocode: vpn_profile=new_vpn_profile(endpoint=123.123.123.123, key=newrandomkey( ))). The router controller 1308 sends the VPN configuration to the virtual router 1212, creates the tunnel network namespace 1220, creates tun0 1256, and starts/restarts the VPN process 1304 (operation 1424). (The operation 1424 may be implemented using, for example, the pseudocode: send_vpn_configuration(key=key, client_hardware=client_hardware)). The virtual peers 1248, 1252 and the virtual ethernet interfaces 1240, 1244 are created in pairs as an atomic operation, such that virtual ethernet interface 1240 and virtual peer 1248 are established together, the virtual ethernet interface 1244 and the virtual peer 1252 are established together, and the like. The establishment of the virtual peers 1248, 1252 and the virtual ethernet interfaces 1240, 1244 also occurs during operation 1424 (that is, each time a new client device 1204-1, 1204-2 is added in operation 1404). Given the teachings herein, the person of ordinary skill in the art will be able to adapt known techniques to establish the virtual peer 1248, 1252 and the virtual ethernet interfaces 1240, 1244, as well as to create the tunnel network namespace 1220 and tun0 1256. The router controller 1308 sends the VPN profile to the application server 1312 (operation 1428). (The operation 1428 may be implemented using, for example, the pseudocode: send_vpn_profile(vpn_profile)).

The application server 1312 continues to poll the router controller 1308 for the client VPN profile until the VPN profile is received (operation 1412 above) and, subsequent to receiving the client VPN profile (as indicated by the dashed arrow in FIG. 12), the application server 1312 provides the VPN profile to the client 1204-1 (operation 1436). In one example embodiment, to conserve resources, the virtual router 1212 is shutdown following operation 1436 and a lighter-weight cloud listener is employed to re-instantiate the virtual router 1212 in response to an attempted VPN connection from the client 1204-1. The cloud listener can be, for example, a lightweight element that allows resources to be preserved once a cloud router configuration has been created and replaces the virtual router 1212 at any time there is not an active VPN connection to the virtual router 1212. When a VPN connection is initiated at a later time, a configured virtual router 1212 is instantiated and seamlessly takes the place of the cloud listener. Given the teachings herein, the person of ordinary skill in the art will be able to adapt known techniques for configuration of an original router and/or a router virtualized or duplicated into the cloud. One non-limiting example of suitable software that can be employed is the Plume software built on OpenSync, an open source agent for cloud management and control, available from Plume Design, Inc. Palo Alto Calif., USA. Given the teachings herein, the person of ordinary skill in the art will be able to adapt known techniques to implement the cloud listener; e.g., in a manner similar to a server load balancer.

Following operations 1404-1436, Message 1 is issued, as described above in conjunction with FIG. 11, to initiate a connection between the client device 1204-1 and the VPN process 1304, which is either already in existence on the virtual router 1202, or the virtual router 1202 is seamlessly started/restarted to handle the connection. At this point, the tunnel network namespace 1220 and tun0 1256 exist, but client 1204-1 has no established path to the Internet for network traffic utilizing the maintained network address.

In a first example embodiment, Message 2 includes the notification from the virtual router 1212 to the router controller 1308 for establishing a path to the Internet as the virtual router 1212 is able to include the Client MAC Address by virtue of it appearing in the VPN profile.

In a second example embodiment, the virtual router 1212 already has sufficient information to act on its own as a result of the client 1204-1 connecting with the VPN profile, so the virtual router 1212 can accomplish the operations in Message 3 without any communication with the router controller 1308. The second embodiment is essentially an abridged version of the process from the first embodiment and can be used, for example, in cases where there was a previous usage of the first embodiment. As noted above, in one or more embodiments, the virtual peer 1248, 1252 and the virtual ethernet interfaces 1240, 1244 are veer created in pairs as an atomic operation, so 1240 and 1248 always (in this non-limiting example) come together, 1244 and 1252 (in this non-limiting example, for all values of 1248 and 1252) always (in this non-limiting example) come together. This happens in operation 1428 of FIG. 12 each time a new client is added using step 1404. The two branches in FIG. 12 can be envisioned as a parallel or asynchronous process. The application server can jump right to state 1412 once the request in 1408 is sent. In one or more embodiments, all the steps in the right fork should happen before proceeding from 1412 to 1436.

Recapitulation

Given the discussion thus far, it will be appreciated that, in general terms, an exemplary method, according to an aspect of the invention, includes the operations of instantiating a VPN tunnel interface 1256 within a router 1212 based on a tunnel network namespace 1220 (operation 1424); instantiating one or more virtual peers 1248, 1252 corresponding to the VPN tunnel interface 1256 (operation 1424); instantiating one or more virtual ethernet interfaces 1240, 1244 corresponding to the one or more virtual peers 1248, 1252 (operation 1424); configuring the tunnel network namespace 1220 to route the network traffic from a specified client device 1204-1, 1204-2 to a specified virtual peer of the one or more virtual peers 1248, 1252 via the VPN tunnel interface 1256, the routing being based on a source address (operation 1424); establishing a connection between a client device 1204-1, 1204-2 and a VPN process 1304 of the router 1212 (operation 1440); and transporting a traffic flow to and from the client device 1204-1, 1204-2 through a VPN tunnel via the VPN tunnel interface 1256, the one or more virtual peers 1248, 1252, and the one or more virtual ethernet interfaces 1240, 1244, based on the configured tunnel network namespace (operation 1444).

In one example embodiment, the router 1212 is implemented as a virtual router residing in a cloud environment. In one example embodiment, a request to instantiate the router 1212 is obtained, the request including an address of the client device 1204-1 (operation 1404). In one example embodiment, a router controller 1308 is informed of an address of the router 1212 (operation 1416). In one example embodiment, a virtual private network (VPN) profile is created for the client device 1204-1, the virtual private network (VPN) profile comprising a client media access control (MAC) address and a router internet protocol (IP) address (operation 1420) and a virtual private network (VPN) configuration is sent to the router 1212 (operation 1424). In one example embodiment, a router controller 1308 is polled for a virtual private network (VPN) profile (operation 1412).

In one example embodiment, the instantiating of the VPN tunnel interface 1256 within the router 1212 is performed in a customer premises environment. In one example embodiment, the virtual peer 1248, 1252 encapsulates the traffic flow using an existing media access control (MAC) address of the client device 1204-1, 1204-2. In one example embodiment, a TUN device 1256 is created in the tunnel network namespace 1220. In one example embodiment, each virtual ethernet interface 1240, 1244 is instantiated as an interface for a corresponding virtual peer of the one or more virtual peers 1248, 1252.

In one example embodiment, a system for communicating with a plurality of client devices 1204-1, 1204-2 comprises a router 1212 having a default network namespace, a virtual private network (VPN) process 1304, a virtual private network (VPN) tunnel interface 1256, one or more virtual peers 1248, 1252, and one or more virtual ethernet interfaces 1240, 1244; a VPN tunnel; and a router controller 1308 having a memory and at least one processor coupled to the memory, the router controller 1308 configured to trigger an instantiation of the VPN tunnel interface 1256 within the router 1212 based on a tunnel network namespace 1220 (operation 1424); trigger an instantiation of the one or more virtual peers 1248, 1252, within the tunnel network namespace 1220, corresponding to the VPN tunnel interface 1256 (operation 1424); trigger an instantiation of the one or more virtual ethernet interfaces 1240, 1244, corresponding to the one or more virtual peers 1248, 1252, within the default network namespace (operation 1424); and configure the tunnel network namespace 1220 to route network traffic from a specified one of the client devices 1204-1, 1204-2 to a specified virtual peer 1248, 1252 of the one or more virtual peers 1248, 1252 via the VPN tunnel interface 1256, the routing being based on a source address (operation 1424); wherein the router 1212 and the router controller 1308 are cooperatively configured to establish a connection between the specified client device 1204-1, 1204-2 and the virtual private network (VPN) process 1304 (operation 1440) and transport a traffic flow to and from the specified client device 1204-1, 1204-2 through the VPN tunnel via the VPN tunnel interface 1256, the one or more virtual peers 1248, 1252, and the one or more virtual ethernet interfaces, based on the configured tunnel network namespace 1220 (operation 1444).

In one example embodiment, the router 1212 is implemented as a virtual router residing in a cloud environment. In one example embodiment, the router 1212 controller is further configured to obtain a request to instantiate the router 1212, the request including an address of the specified client device 1204-1, 1204-2. In one example embodiment, the router controller 1308 is further configured to receive an address of the router 1212. In one example embodiment, the router controller 1308 is further configured to create a virtual private network (VPN) profile for the specified client device 1204-1, 1204-2, the virtual private network (VPN) profile comprising a client media access control (MAC) address and a router internet protocol (IP) address and sending a virtual private network (VPN) configuration to the router 1212. In one example embodiment, the router controller 1308 is further configured to respond to polling for a virtual private network (VPN) profile. In one example embodiment, the instantiating of the VPN tunnel interface within the router 1212 is performed in a customer premises environment. In one example embodiment, the virtual peer 1248, 1252 encapsulates the traffic flow using an existing media access control (MAC) address of the specified client device 1204-1, 1204-2. In one example embodiment, the router controller 1308 is further configured to trigger creation of a TUN device 1256 in the tunnel network namespace 1220. In one example embodiment, each virtual ethernet interface 1240, 1244 is instantiated as an interface for a corresponding virtual peer 1248, 1252 of the one or more virtual peers 1248, 1252.

In one or more embodiments, the system does not include the client devices; i.e., they are external workpieces to the system. In another aspect, the system includes one, some, or all of the client devices.

Figure 7:
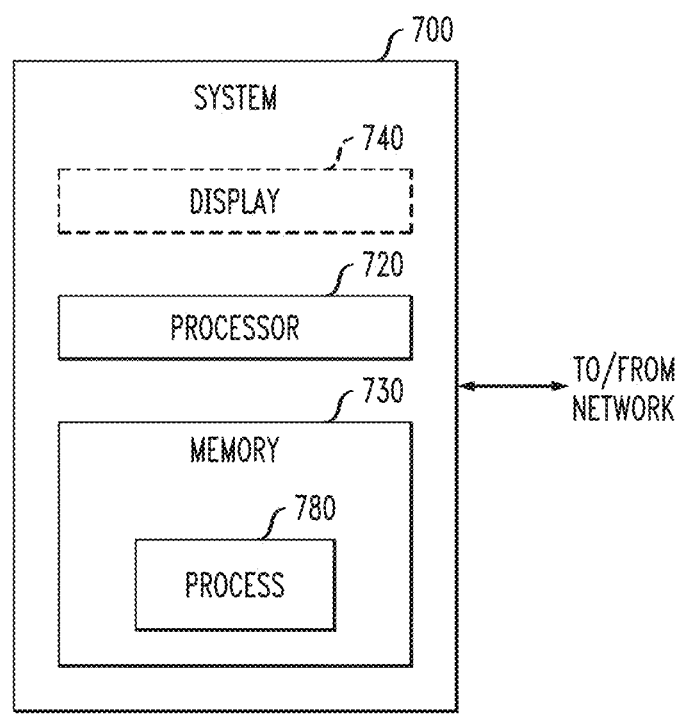
FIG. 7 is a block diagram of a computer system useful in connection with one or more aspects of the invention.

In another aspect, a router controller 1308 is provided for controlling a router 1212. The router has a default network namespace 1260 and a virtual private network (VPN) process 1304, and is in communication with a plurality of client devices 1204-1, 1204-2. The router controller includes a memory; and at least one processor, coupled to the memory (see, e.g., FIG. 7), and operative to: trigger an instantiation of a VPN tunnel interface 1256 within the router based on a tunnel network namespace 1220; trigger an instantiation of one or more virtual peers 1248, 1252, within the tunnel network namespace, corresponding to the VPN tunnel interface; and trigger an instantiation of one or more virtual ethernet interfaces 1240, 1244 corresponding to the one or more virtual peers, within the default network namespace. The processor is further operative to configure the tunnel network namespace to route network traffic from a specified one of the client devices to a specified virtual peer of the one or more virtual peers via the VPN tunnel interface, the routing being based on a source address. The router controller further configures the router such that the router and the router controller are cooperatively configured to establish a connection between the specified client device and the virtual private network (VPN) process and to transport a traffic flow to and from the specified client device through a VPN tunnel (labeled Link 1 for the client device 1204-1 and Link 5 for the client device 1204-2) via the VPN tunnel interface, the one or more virtual peers, and the one or more virtual ethernet interfaces, based on the configured tunnel network namespace.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

FIG. 6 is a block diagram of at least a portion of an exemplary system 600 that can be configured to implement at least some aspects of the invention, and is representative, for example, of one or more of the apparatus or modules shown in the figures. As shown in FIG. 6, memory 630 configures the processor 620 to implement one or more methods, steps, and functions (collectively, shown as process 650 in FIG. 6). The memory 630 could be distributed or local and the processor 620 could be distributed or singular. Different steps could be carried out by different processors, either concurrently (i.e., in parallel) or sequentially (i.e., in series).

The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transporting network traffic, the method comprising:
   instantiating a VPN tunnel interface within a router based on a tunnel network namespace;
   instantiating one or more virtual peers corresponding to the VPN tunnel interface;
   instantiating one or more virtual interfaces corresponding to the one or more virtual peers;
   configuring the tunnel network namespace to route the network traffic from a specified client device to a specified virtual peer of the one or more virtual peers via the VPN tunnel interface, the routing being based on a source address;
   establishing a connection between a client device and a VPN process of the router;
   encapsulating, by one of said virtual peers, a traffic flow using an existing media access control (MAC) address of the specified client device; and
   transporting the traffic flow to and from the client device through a VPN tunnel via the VPN tunnel interface, the one or more virtual peers, and the one or more virtual interfaces, based on the configured tunnel network namespace.

2. The method of claim 1, further comprising implementing said router as a virtual router residing in a cloud environment.

3. A method for transporting network traffic, the method comprising:
   obtaining a request to instantiate a router, the request including an address of a specified client device;
   instantiating a VPN tunnel interface within the router based on a tunnel network namespace;
   instantiating one or more virtual peers corresponding to the VPN tunnel interface;
   instantiating one or more virtual interfaces corresponding to the one or more virtual peers;
   configuring the tunnel network namespace to route the network traffic from the specified client device to a specified virtual peer of the one or more virtual peers via the VPN tunnel interface, the routing being based on a source address;
   establishing a connection between a client device and a VPN process of the router; and
   transporting a traffic flow to and from the client device through a VPN tunnel via the VPN tunnel interface, the one or more virtual peers, and the one or more virtual interfaces, based on the configured tunnel network namespace.

4. The method of claim 3, further comprising informing a router controller of an address of the router.

5. The method of claim 3, further comprising creating a virtual private network (VPN) profile for the client device, the virtual private network (VPN) profile comprising a client media access control (MAC) address and a router internet protocol (IP) address and sending a virtual private network (VPN) configuration to the router.

6. The method of claim 3, further comprising polling a router controller for a virtual private network (VPN) profile.

7. The method of claim 3, wherein said instantiating of said VPN tunnel interface within said router is performed in a customer premises environment.

8. The method of claim 3, further comprising encapsulating, by said virtual peer, the traffic flow using an existing media access control (MAC) address of the client device.

9. The method of claim 3, further comprising creating a TUN device in the tunnel network namespace.

10. The method of claim 3, wherein each virtual interface is instantiated as an interface for a corresponding virtual peer of the one or more virtual peers.

11. A system for communicating with a plurality of client devices, the system comprising:
    a router having a default network namespace, a virtual private network (VPN) process, a virtual private network (VPN) tunnel interface, one or more virtual peers, and one or more virtual interfaces;
    a VPN tunnel; and
    a router controller configured to:
       trigger an instantiation of the VPN tunnel interface within the router based on a tunnel network namespace;
       trigger an instantiation of the one or more virtual peers, within the tunnel network namespace, corresponding to the VPN tunnel interface;
       trigger an instantiation of the one or more virtual interfaces, corresponding to the one or more virtual peers, within the default network namespace; and
       configure the tunnel network namespace to route network traffic from a specified one of the client devices to a specified virtual peer of the one or more virtual peers via the VPN tunnel interface, the routing being based on a source address;

wherein the router and the router controller are cooperatively configured to establish a connection between the specified client device and the virtual private network (VPN) process and transport a traffic flow to and from the specified client device through the VPN tunnel via the VPN tunnel interface, the one or more virtual peers, and the one or more virtual interfaces, based on the configured tunnel network namespace, and wherein one of said virtual peers encapsulates the traffic flow using an existing media access control (MAC) address of the specified client device.

12. The system of claim 11, wherein the router is implemented as a virtual router residing in a cloud environment.

13. A system for communicating with a plurality of client devices, the system comprising:
 a router having a default network namespace, a virtual private network (VPN) process, a virtual private network (VPN) tunnel interface, one or more virtual peers, and one or more virtual interfaces;
 a VPN tunnel; and
 a router controller configured to:
  obtain a request to instantiate the router, the request including an address of a specified client device of the client devices;
  trigger an instantiation of the VPN tunnel interface within the router based on a tunnel network namespace;
  trigger an instantiation of the one or more virtual peers, within the tunnel network namespace, corresponding to the VPN tunnel interface;
  trigger an instantiation of the one or more virtual interfaces, corresponding to the one or more virtual peers, within the default network namespace; and
  configure the tunnel network namespace to route network traffic from the specified client device to a specified virtual peer of the one or more virtual peers via the VPN tunnel interface, the routing being based on a source address;
 wherein the router and the router controller are cooperatively configured to establish a connection between the specified client device and the virtual private network (VPN) process and transport a traffic flow to and from the specified client device through the VPN tunnel via the VPN tunnel interface, the one or more virtual peers, and the one or more virtual interfaces, based on the configured tunnel network namespace.

14. The system of claim 13, the router controller being further configured to receive an address of the router.

15. The system of claim 13, the router controller being further configured to create a virtual private network (VPN) profile for the specified client device, the virtual private network (VPN) profile comprising a client media access control (MAC) address and a router internet protocol (IP) address and sending a virtual private network (VPN) configuration to the router.

16. The system of claim 13, the router controller being further configured to respond to polling for a virtual private network (VPN) profile.

17. The system of claim 13, wherein the instantiating of the VPN tunnel interface within the router is performed in a customer premises environment.

18. The system of claim 13, wherein said virtual peer encapsulates the traffic flow using an existing media access control (MAC) address of the specified client device.

19. The system of claim 13, the router controller being further configured to trigger creation of a TUN device in the tunnel network namespace.

20. The system of claim 13, wherein each virtual interface is instantiated as an interface for a corresponding virtual peer of the one or more virtual peers.

21. The system of claim 13, further comprising the plurality of client devices.

22. A router controller for controlling a router, the router having a default network namespace and a virtual private network (VPN) process, and being in communication with a plurality of client devices, the router controller comprising:
 a memory; and
 at least one processor, coupled to said memory, and operative to:
  trigger an instantiation of a VPN tunnel interface within the router based on a tunnel network namespace;
  trigger an instantiation of one or more virtual peers, within the tunnel network namespace, corresponding to the VPN tunnel interface;
  trigger an instantiation of one or more virtual interfaces, corresponding to the one or more virtual peers, within the default network namespace;
  configure the tunnel network namespace to route network traffic from a specified one of the client devices to a specified virtual peer of the one or more virtual peers via the VPN tunnel interface, the routing being based on a source address; and
  obtain a request to instantiate the router, the request including an address of the specified client device;
 wherein the router controller further configures the router such that the router and the router controller are cooperatively configured to establish a connection between the specified client device and the virtual private network (VPN) process and to transport a traffic flow to and from the specified client device through a VPN tunnel via the VPN tunnel interface, the one or more virtual peers, and the one or more virtual interfaces, based on the configured tunnel network namespace.

* * * * *